United States Patent [19]

Koy et al.

[11] 4,229,639
[45] Oct. 21, 1980

[54] ENERGY BEAM WELDING METHOD

[75] Inventors: Johannes Koy, Germering; Franz Rappold; Erwin Kappelsberger, both of Munich, all of Fed. Rep. of Germany

[73] Assignee: Steigerwald Strahltechnik GmbH, Fed. Rep. of Germany

[21] Appl. No.: 826,395

[22] Filed: Aug. 16, 1977

[30] Foreign Application Priority Data

Aug. 19, 1976 [DE] Fed. Rep. of Germany ....... 2637371

[51] Int. Cl.³ ............................................. B23K 15/00
[52] U.S. Cl. ............................................. 219/121 EM
[58] Field of Search ................. 219/121 LM, 121 EM

[56] References Cited

U.S. PATENT DOCUMENTS

3,378,670 4/1968 Smith et al. ................. 219/121 EM

FOREIGN PATENT DOCUMENTS

2101413 1/1971 Fed. Rep. of Germany ... 219/121 EM
1114985 5/1968 United Kingdom ............. 219/121 EM
1453526 10/1976 United Kingdom ............. 219/121 EM Primary Examiner—C. L. Albritton
Attorney, Agent, or Firm—Brumbaugh, Graves, Donohue & Raymond

[57] ABSTRACT

Disclosed is a method for producing an elongated weld seam in a workpiece by the use of a beam of charged particles, in particular an electron beam. According to the disclosed method, a beam of charged particles is directed to impinge on a workpiece and has a selected beam current, a selected accelerating voltage and is focused by a focusing field of a selected field strength. In order to produce a weld seam there is provided a relative motion between the charged particle beam and the workpiece, to move the point of impingement along the workpiece. The relative motion has a predetermined selected instantaneous velocity. The depth of penetration of the charged particle beam into the workpiece is varied by changing a parameter selected from the group consisting of the beam current and the velocity of relative motion. According to the improvement of the invention, simultaneous with the changing of the depth of penetration, there is provided an active control to change at least one parameter selected from a second group consisting of the strength of the focusing field, the amplitude of periodic beam deflection in a direction parallel or transverse to the path of the relative motion and the frequency of periodic beam deflection in a direction parallel or transverse to the relative motion.

17 Claims, 7 Drawing Figures

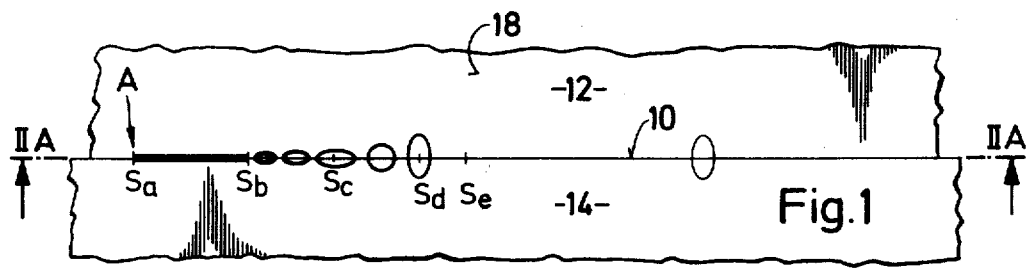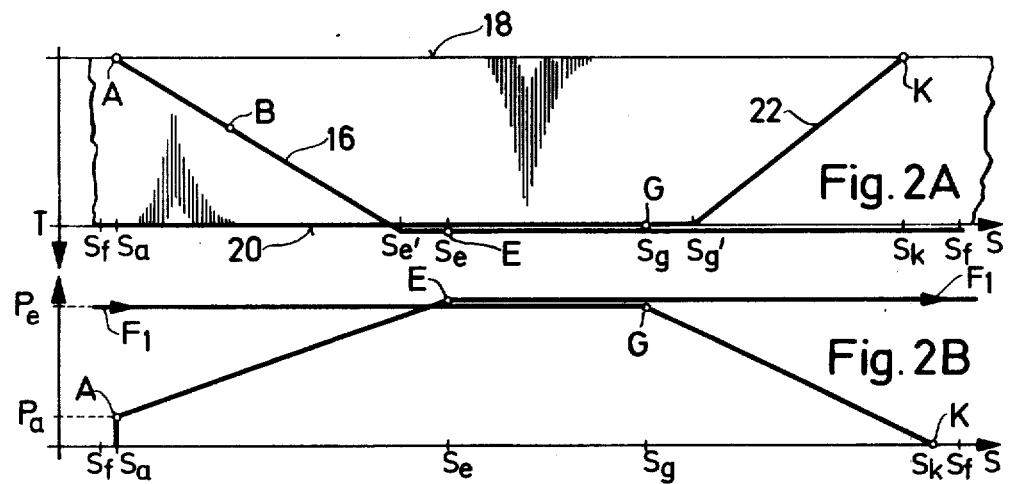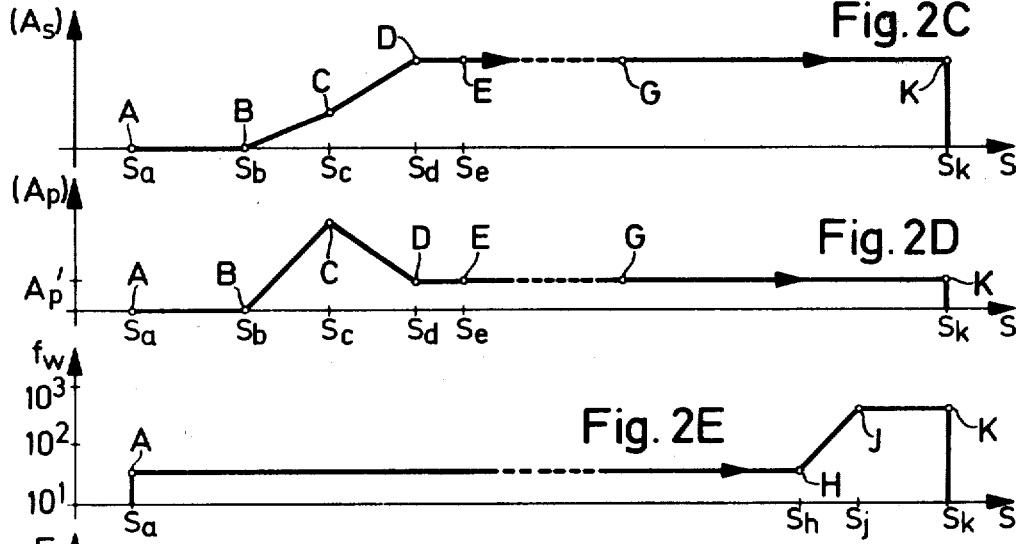

ENERGY BEAM WELDING METHOD

BACKGROUND OF THE INVENTION

The present invention relates to energy beam welding including electron beam and laser beam welding, for producing a weld seam in a work piece, wherein the energy beam and the work piece are moved relative to each other in the direction of the weld seam and the depth of a fused or welding zone (welding depth) in the work piece, measured in the direction of propagation of said energy beam, is varied along at least a portion of the weld seam by changing a welding parameter, generally the beam power.

When producing a weld seam by means of an energy beam, it is often necessary or advisable to start the welding operation with a relatively low beam power and to increase the beam power gradually to a final or nominal value while proceeding with the beam along the joint to be welded. The final or nominal value is then at least essentially maintained during the welding of the main portion of the weld seam or at most adjusted to cope with a varying work piece thickness. The "slope-in" region, during which the beam power is gradually increased and a fused or molten zone of gradually increasing depth is produced, has to be "overwelded" later to produce also in the slope-in region a welded zone which has throughout a final desired depth. Following to such overwelding, the beam power is then gradually reduced to produce a "slope-out" region, within which the remelted zone of the weld seam becomes gradually more shallow, until it eventually vanishes. Energy beam welding processes of this type are used mainly for producing a weld seam having the shape of a closed curve or loop, a typical example being the butt welding of two tube sections abutting with their front faces. The gradually increasing the beam power avoids inter alia that molten work piece material is thrown out of the welding zone at the beginning of the seam welding and is missing later. This is a severe problem, especially when work pieces in form of thick-walled hollow cylinders are to be joined by an energy beam, as an electron beam. Similar problems are generally also encountered when a weld seam is commenced in a work piece of relatively great thickness, and in repair welding operations, whereby only the slope-in region or the slope-out region may be required and the welding zone may extend to a portion of the work piece thickness only, and an overwelding may not be necessary.

It is general practice to periodically oscillate the energy beam at least in a direction transverse to the length dimension of the joint or weld seam when workpiece parts of greater thicknesses are welded, such oscillation being sometimes called "wagging". At the present state of the art, the parameters of such beam oscillation, e.g. the oscillation or deflection amplitude in a direction transverse and/or lengthwise to the longitudinal direction of the joint or seam, and the frequency of oscillation, were preset before the welding process is commenced and maintained essentially constant during the welding of the seam including the slope-in and slope-out regions. Other beam parameters, as the position of the beam focus in respect to the work piece, were also maintained constant throughout the welding.

In spite of a careful control of the variation of the beam power in the slope-in and slope-out regions, defects, as small voids and such a tendency of some materials to crack, could not be always prevented. Further, the weld seam did not have the desired uniformity of cross section and form of weld seam surface.

It is an object of the invention to provide a method of welding by means of an energy beam, as an electron beam, which is adapted to form loop-shaped welding seams, which inherently comprise a slope-in region which is overwelded in the course of the welding operation, and an slope-out region which remains unaltered; and elongated weld zones comprising individual slope-in or slope-out regions which may remain unaltered, where the quality standard of an uniform welding seam having its full depth can be essentially secured.

SUMMARY OF THE INVENTION

According to an embodiment of the invention, a method of welding by means of an energy beam, as an electron beam, wherein the depth of welding or fusing or melting a workpiece material is varied during a predetermined period of time or along a predetermined length of the weld seam by varying a first welding parameter, as the beam power, is characterized according to the invention that at least one further welding parameter is changed during said predetermined period of time or said predetermined length of the weld seam.

The term "welding parameter" is intended to include any parameter of the welding process which has an influence on the thermal conditions in the welding zone comprising molten workpiece material and, if any, molten additional material supplied to fill up any gap at the joint or to alter the properties of the weld seam. Thus, the welding parameters include the relative speed of motion between the energy beam and the workpiece along the joint, further the frequency at the amplitude of the oscillation of the beam in transverse and longitudinal direction of the joint, and the power density distribution of the beam in the welding zone, i.e. the state and type of focussing.

The energy beam welding method according to the invention provides slope-in and/or slope-out regions of a weld seam which have a high standard both in technical and optical respect, i.e. high strength, freedom of porosity and cracks, and form and shape of the upper and lower weld seam surface, respectively.

The method according to the invention is specifically but not exclusively useful for forming loop-shaped weld seams including joints having a plane, conical or cylindrical shape.

Welding parameters which are preferably altered in accordance with the method according to the invention to produce an enhanced quality of the overwelded zone are the amplitudes of beam oscillation in transverse and length direction of the joint, the ratio of the amplitudes of oscillation in transverse and length direction of the joint, the frequency of such oscillation, and the focussing conditions of the beam.

It is within the scope of the method according to the invention that one or a plurality of additional welding parameters are altered during the same or different portions of the inverval of time or length section of the weld seam in which the depth of welding is changed.

Further advantages and features of the invention will become apparent from the following description of preferred embodiments of the invention.

The invention is particularly useful for electron beam welding.

A preferred embodiment of the energy, as electron, beam welding method according to the invention com prises the steps to start the slope-in region with a small or zero amplitude of beam oscillation. The focus of the beam may be on or closely adjacent to the workpiece surface on which the beam impinges. During a predetermined period of time, which may be e.g. one-fifth to one-third of the slope-in period, the position of the focus is continuously changed until the final position is obtained which is used for welding the seam following the slope-in region. The final position of the focus may be in the middle of the joint, seen in the direction of propagation of the beam or in the lower half or third of the workpiece. Further, during a predetermined period of time which may be e.g. one-half to two thirds of the slope-in period, the amplitudes of transverse at lengthwise oscillation of the beam is changed such that the final parameters of oscillation are attained shortly before the termination of the slope-in period. The final oscillation parameters are preferably such that the beam describes an elliptic path on the work piece surface on which it impinges, the elliptic path having a major axis extending in a direction perpendicular to the length direction of the joint or seam. The frequency of oscillation may be in the order of about 30 Hz. The beam power is preferably changed in a linear manner during the slope-in and slope-out regions. In the slope-out region, the described sequence may be followed in reverse order. According to a modification of the described embodiment, the frequency of oscillation is increased by a factor of e.g. 10 to 20 during slope-out. This change of oscillation frequency is preferably effected during an initial or middle portion of the slope-out region.

During the slope-in region, the major axis of the elliptic path described by the oscillating beam may be aligned to the joint or seam, and the ratio of the amplitude of oscillation in transverse and length direction may become gradually reversed so that the final elliptic path having the major axis oriented perpendicularly to the length direction of the joint is obtained at about two thirds of the slope-in region.

BRIEF DESCRIPTION OF THE DRAWING

Further embodiments of the invention will be described with reference to the drawings.

FIG. 1 shows a plane view on a portion of two workpiece parts which are joined by an electron beam welding method according an embodiment of the invention; FIG. 1 may be regarded as a portion of the surface of a butt joint of two thick-walled tube sections, the surface being developed into the plane of drawing;

FIG. 2a shows a section in a plane II—II of FIG. 1 comprising the joint surface between the workpiece parts and showing typical pattern of the depth of welding;

FIG. 2b is a diagram having the same horizontal or joint length coordinate as FIG. 2a and shows the magnitude of the electron beam energy as a function of the location in the length direction of the joint;

FIG. 2c is a diagram similar to that of FIG. 2b and shows the amplitude $A_s$ of the transverse oscillation of the electron beam as a function of the location of the beam along the joint;

FIG. 2d is a diagram similar to that of FIG. 2c and shows the amplitude $A_p$ of the oscillation of the electron beam in the length direction of the joint as a function of the beam position along a joint;

FIG. 2e is a diagram similar to those of FIGS. 2c and 2d and shows the frequency of transverse and lengthwise oscillation of the electron beam as a function of the beam position along the joint;

FIG. 2f shows schematically an example of the change of the position of the focus of the electron beam as a function of the position of the beam with respect to the joint.

In FIGS. 1 and 2 is the horizontal direction along the joint, the scale being the same in all Figures, thus, points aligned in the vertical direction of the drawings correspond to each other in respect to the specific point of the joint.

The beam is oscillated with the same frequency in the transverse and lengthwise direction, the amplitudes of such deflections having a phase offset of 90 degrees so that the electron beam follows an elliptical or circular path.

DESCRIPTION OF THE INVENTION

FIG. 1 shows a developed plane view of two tube sections 12 and 14 having front ends positioned in contact with each other to form a butt joint 10. The butt joint is to be welded by an electron beam, the welding can be performed by a known electron beam welding machine as manufactured and sold by Steigerwald Strahltechnik GmbH, Munich-Puchheim/Germany. The tube sections to be joined by welding are positioned in a fixture so that an axis of the electron beam lies in a plane of the butt and extends at least substantially diametrical to the tube section. The tube sections are rotated around their colinear axes during the welding. It is assumed for the purpose of the following description that the direction of relative movement produced in this manner corresponds to a motion of the electron beam from the left hand side to the right hand side in FIGS. 1 and 2.

The welding process starts at point A of the joint 10 with a beam power of value zero or a relatively low initial value $P_a$ (FIG. 2b) and the beam power is increased preferable as a linear function of time or joint length s to a final value $P_e$ while the electron beam moves in respect to the joint 10 through a distance or length section $s_a$-$s_e$ (FIGS. 1 and 2b). The depth T of welding (FIG. 2a) increases correspondingly, as shown a curve section 16 in FIG. 2a, the welding depth or molten zone will generally arive at a work piece surface 20 before the beam power has risen to its final value $P_e$, the work piece surface 20 being the work piece surface which is opposite to a workpiece surface 18 on which the beam impinges.

The welding proceeds then along the joint 10 with the beam power $P_e$ which is chosen to optimise the stationary welding conditions. Since the joint was assumed to be ring-shaped, the electron beam and the welding zone produced by it go through a position $s_f$ and eventually arrive again at the position $s_a$. The slope-in region $s_a$-$s_{e'}$, in which the depth of welding increases continuously, is now again molten ("overwelded") until the beam arrives at a position $s_{g'}$ after which the beam power is decreased, preferably as a linear function of the path length s until a low final value or the value zero is attained at a position $s_k$. Thus, the depth of welding T decreases correspondingly between points $s_{g'}$ and $s_{k'}$, along the curve section 22 to zero. The trapezoidal area A—$s_{e'}$—$s_{g'}$—K of the weld seam is, thus, molten twice, i.e. overwelded.

As far as described, the method of welding is in accordance with the prior art.

As already explained above, the properties of the weld seam are improved by the invention by changing, during the change of the welding depth T, at least one further beam parameter in addition to the beam parameter which primarily determines the depth of welding T, the latter being generally the beam power but may also be the speed of relative movement between the beam and the joint. Preferably at least one parameter of the beam oscillation is altered.

According to the embodiment shown in FIG. 2c and 2d, the amplitudes $A_s$ and $A_p$ (FIGS. 2c, 2d, respectively) of the oscillation of the beam across and along the joint 10, respectively, are zero in an initial section $s_a - s_b$. The amplitude starts to increase as a linear function of the path length s from point $s_b$, the amplitude $A_p$ rising at a higher rate until point $s_c$ of joint 10 than amplitude $A_s$. Because of the phase difference of 90° between the transverse and length oscillation, the electron beam periodically describes an elliptic path while its mean axis proceeds from $s_b$ to $s_c$, the major axis of the ellipses extending along the joint 10. In a path section $s_c - s_d$ the amplitude $A_s$ increases further to a final value which is attained at point D while the amplitude $A_p$ of the length oscillation decreases to a final value $A_p$, while the beam proceeds from $s_c$ to $s_d$. Thus, initially the beam describes a "longitudinal ellipse" which changes its shape between point $s_c$ to a circle and then into the final shape of a transverse ellipse in point $s_d$ (see FIG. 1). The length of the major and minor axes of the ellipses described at points $s_c$, and $s_d$ may be e.g. 2.5 and 1.25 mm.

The shape of the transverse ellipse can be maintained until the end of the welding process.

A further parameter, which can be changed in accordance with the invention, is the frequency of oscillation. As FIG. 2e shows, the oscillation starts preferably with a relatively low frequency, e.g. in the order of 30 Hz, and this low frequency is maintained in the slope-in region, in the region of steady state welding, and during a first portion of the slope-out region $s_g - s_k$. The frequency $f_w$ of the periodical oscillation of the beam is then preferably increased from the lower value, i.g. 30 Hz to a higher value of e.g. 500 Hz in an intermediate length section of the joint $s_h - s_j$, i.e. between points H and J. This higher value is then maintained until the end of the slope-out region.

A further parameter which can be changed in addition to any of the above mentioned parameters or as a sole further parameter is the condition of focussing. In the embodiment shown in FIG. 2f, the welding starts at the beginning of the slope-in region with a beam which is relatively weak focussed in respect to the welding zone, i.e. the region of lowest beam cross sectional area (focus) is in the direction of beam propagation relatively far before the work piece surface facing the beam or, as shown by line 24 in FIG. 2f, relatively far beyond the rear surface 20 of the work piece parts welded. The focussing is then increased gradually during the slope-in region so that the focus is e.g. in a middle region between the surfaces 18 and 20 at the end of the slope-in region. In a similar way, the focussing can be made gradually weaker in the slope-out region, as the focus position line 26 in FIG. 2f shows.

The steps described with reference to FIGS. 2c to 2f can be used invidually or in any desired combination. The values given are examples only and may be changed at will.

The slope-out region may be shorter than the slope-in region. Slope-in and slope-out regions may overlap in part or totally.

While the method herein described constitutes preferred embodiments of the invention, it is to be understood that the invention is not limited to this precise method and that changes may be made without departing from the scope of the invention which is defined in the appended claims.

We claim:

1. A method for producing an elongated weld seam in a workpiece by means of a beam of charged particles, said method comprising the steps:
   (a) producing a beam of charged particles directed to a point of impingement on said workpiece; said beam having a selected beam current and a selected accelerating voltage and being focused by a focussing field of selected field strength;
   (b) producing a relative motion of said beam with respect to said workpiece to move said point of impingement along said workpiece, said relative motion having a selected instantaneous velocity;
   (c) changing at least one parameter selected from a first group consisting of
      (c1) beam current, and
      (c2) velocity of relative motion to change the depth penetration of the beam into said workpiece;
   said method further characterized by the step
   (d) changing, by active direct control, concurrent with said first parameter group change, at least one parameter selected from a second group consisting of:
      (d1) strength of focussing field;
      (d2) amplitude of periodic beam deflection in a direction parallel to said relative motion;
      (d3) amplitude of periodic beam deflection in a direction transverse to said relative motion;
      (d4) frequency of periodic beam deflection in a direction parallel to said relative motion;
      (d5) frequency of periodic beam deflection in a direction transverse to said relative motion.

2. The method as specified in claim 1, wherein said energy beam is an electron beam.

3. The method as specified in claim 1 or 2, wherein said parameter selected from said second group comprises amplitude of beam deflection and wherein said amplitude of beam deflection is changed as a direct function of depth of beam penetration.

4. The method as specified in claim 3, wherein said amplitude of beam deflection is changed in a manner which changes the ratio of amplitudes of beam deflection in said parallel and transverse directions.

5. The method as specified in claim 4, wherein said parallel and transverse beam deflections have a phase relationship which causes said point of impingement to move in an eliptical or circular path.

6. The method as specified in claim 1, wherein said parameter selected from said second group comprises frequency of said periodic beam deflection, wherein said depth of beam penetration is changed over a selected time interval, and wherein said frequency is changed, at least during a portion of said selected time interval, in accordance with an inverse function of said depth of penetration.

7. The method as specified in claim 1, wherein said parameter selected from said second parameter group comprises frequency of periodic beam deflection in a direction transverse to said beam axis, and wherein said frequency is increased as said depth of penetration is decreased.

8. The method as specified in claim 7, wherein said frequency is increased from approximately 30 Hertz to a value of about approximately 500 Hertz.

9. The method in accordance with claim 1, wherein said parameter selected from said second group is the strength of said focusing field and wherein said strength of said focusing field is varied to change the location of a beam focus relative to the surface of said workpiece.

10. The method as specified in claim 9, wherein said depth of penetration is changed during a selected length of relative motion between the beam and said workpiece and wherein said focusing is changed during at least a one-third portion of said selected length.

11. The method as specified in claim 1 or 2, wherein said parameter selected from said second parameter group is strength of said focusing field, and wherein said focusing field is changed to cause said energy beam to become less focused as said depth of penetration is reduced.

12. The method as specified in claim 1 or 2, wherein said parameter selected from said second group is gradually changed by said active direct control.

13. The method as specified in claim 1 or 2, wherein said change by active direct control of said parameter selected from said second group comprises a linear change as a function of time.

14. The method as specified in claim 1 or 2, wherein said relative motion causes said point of impingement to move along said workpiece in a closed loop, wherein said depth of penetration is increased to a maximum value during a first portion of said relative motion, wherein said depth of penetration and said relative parameters in said first and second group are maintained essentially constant for constant workpiece thickness during a second portion of said relative motion, said second portion of relative motion at least partially overlapping said first portion of relative motion and wherein said depth of penetration is decreased in a third portion of said relative motion.

15. The method as specified in claim 14, wherein during said second portion of said relative motion said depth of penetration is varied by variation of one of said first group of parameters, according to the thickness of said workpiece.

16. The method as specified in claim 1, wherein said parameters selected from said second group comprises strength of focusing field and wherein said focusing field is varied to cause said energy beam to change its focus from a focus position within said workpiece in the direction of the workpiece surface on which said beam is incident as said depth of penetration is decreased.

17. A method as specified in claim 1 or 2, wherein said selected accelerating voltage is maintained constant as said depth of penetration is varied by changing said parameter selected from said first group.

* * * * *